No. 799,927. PATENTED SEPT. 19, 1905.
O. H. NEBEL & J. H. PETERSON.
MACHINE FOR TREATING CREAM.
APPLICATION FILED APR. 18, 1905.
2 SHEETS—SHEET 2.
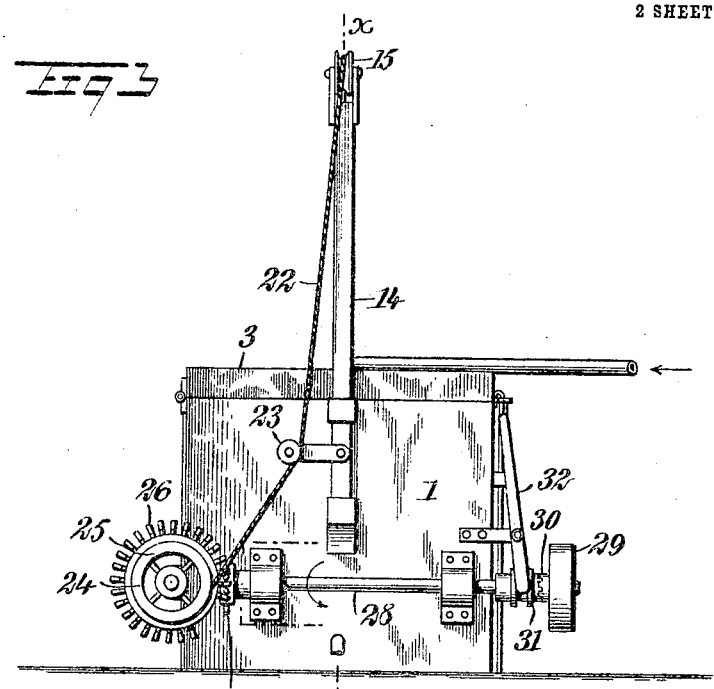
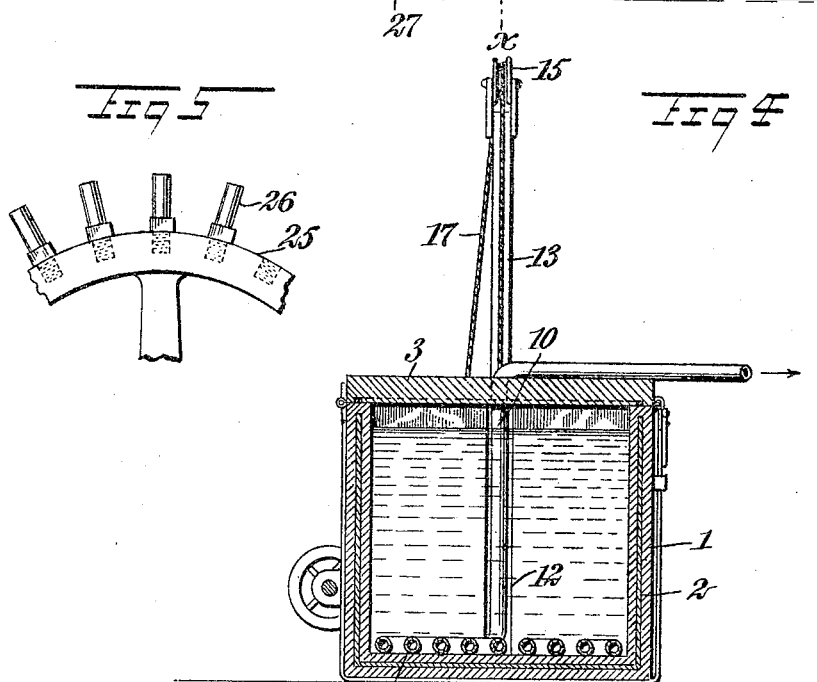
WITNESSES:
H. Walker
C. R. Ferguson
INVENTORS
Oscar H. Nebel
John H. Peterson
BY
ATTORNEYS

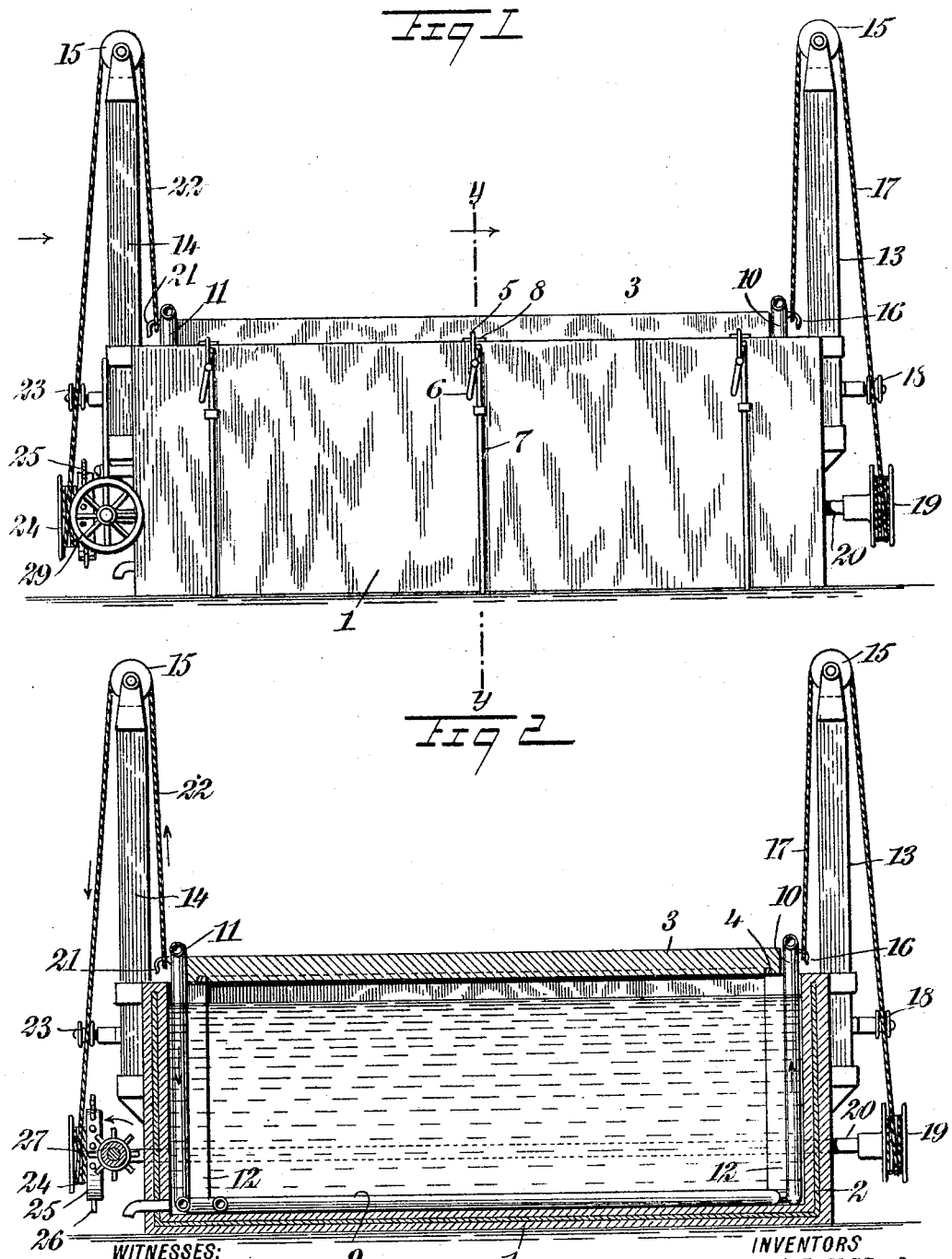

UNITED STATES PATENT OFFICE.

OSCAR H. NEBEL AND JOHN H. PETERSON, OF WORTHINGTON, MINNESOTA.

MACHINE FOR TREATING CREAM.

No. 799,927.     Specification of Letters Patent.     Patented Sept. 19, 1905.

Application filed April 18, 1905. Serial No. 256,195.

*To all whom it may concern:*

Be it known that we, OSCAR H. NEBEL and JOHN H. PETERSON, citizens of the United States, and residents of Worthington, in the county of Nobles and State of Minnesota, have invented a new and Improved Machine for Treating Cream, of which the following is a full, clear, and exact description.

This invention relates to improvements in machines for cooling or heating and tempering cream, the object being to provide a machine of this character that will be simple in construction, easily operated, and having no parts liable to get out of order.

We will describe a machine for treating cream embodying our invention and then point out the novel features in the appended claims.

Reference is to be had to the accompanying drawings, forming a part of this specification, in which similar characters of reference indicate corresponding parts in all the figures.

Figure 1 is a front elevation of a machine for treating cream embodying our invention. Fig. 2 is a section thereof on the line $x\ x$ of Fig. 3. Fig. 3 is an end view looking in the direction of the arrow at the left of Fig. 1. Fig. 4 is a section on the line $y\ y$ of Fig. 1, and Fig. 5 is a fragmentary view of a driving-gear employed.

Referring to the drawings, 1 designates the cream tank or vat having spaced bottom boards, end and side boards, a packing 2, of paper or like insulating material, being arranged in the spaces. Hinged to the rear wall of the tank or vat is a cover 3, provided with a packing 4, of cork or the like, to make close or tight engagement with the upper edges of the vat. The cover is held tightly closed, as here shown, by means of hooks 5 having swinging connection with levers 6, which are pivoted to rods 7, the said hooks 5 engaging with eyes 8 on the front edge of the cover. Movable up and down in the vat is a pipe-coil 9, the ends 10 11 of which are extended upward in channels 12, formed in the inner sides of the end walls of the vat, and these channels, or the walls thereof, serve as guides for the up-and-down movements of the coil. The upper portions of the end members 10 11 are extended forward and adapted to be engaged by flexible tubings through one of which either a heating or cooling medium is passed into the coil, and the medium passes out through the other tube.

Secured to the ends of the vat are standards 13 14, each having a pulley 15 on its upper end. From a hook 16 on the end member 10 of the coil a rope or cable 17 passes upward over the pulley 15 on the standard 13, thence down over an idler-pulley 18 to a winding pulley or drum 19, attached to a shaft 20, which is longitudinally movable in its bearings on the rear side of the vat for a purpose to be hereinafter described. From a hook 21 on the opposite end of the vat 1 a rope or cable 22 passes upward over the pulley 15 on the standard 14, thence down around an idler-pulley 23 to a winding drum or pulley 24 on the shaft 20. Attached to the shaft 20 or to the drum 24 is a driving-gear 25, the teeth 26 of which are made in the form of arms having screw-thread engagement with an arm of the wheel, and it will be noted in Fig. 3 that the teeth or arms are omitted from a portion of the wheel. These teeth or arms are designed to engage with similar teeth or arms on a pinion 27, attached to a counter-shaft 28, on which is loosely mounted a driving-pulley 29, having a clutch member 30 for engaging with a clutch member 31, movable lengthwise of the counter-shaft, but adapted to rotate therewith. The clutch member 31 is provided with an annular channel to receive an actuating-lever 32.

In the operation if it is desired to cool the cream cold water is passed through the pipe, but if it is desired to heat the cream hot water will be passed through the pipe. As the counter-shaft 28 rotates its pinion 27, engaging with the teeth of the wheel 25, will cause a rotary movement of the shaft 20 to wind the ropes 17 and 22 on their respective drums, thus moving the coil upward in the vat. When the mutilated portion of the wheel 25 reaches the pinion 27, the shaft 20 may be shifted lengthwise to move the gear-wheel 25 to the opposite side of the pinion, so that while the shaft 28 moves continuously in one direction the rotary movement of the shaft 20 will be reversed and the coil lowered in the cream.

It will be understood that the cover 3 may be opened at any time during the operation of the machine, so as to observe the condition of the cream in the machine.

Having thus described our invention, we claim as new and desire to secure by Letters Patent—

1. A machine for treating cream, comprising a vat, a pipe-coil in the vat, a lengthwise-movable shaft, drums on said shaft, cable connections between said drums and the pipe-coil, a drive-shaft, a pinion on the drive-shaft, a gear-wheel on the first-named shaft, and means for shifting said first-named shaft to engage its gear-wheel with opposite sides of the pinion.

2. A machine for treating cream comprising a vat, a pipe-coil arranged in the vat, standards on the ends of the vat, pulleys on the upper ends of the standards, a driving-shaft, ropes or cables extended from the coil, over said pulleys, winding-drums on the shaft with which said ropes or cables connect, a counter-shaft having gear connection with the first-named shaft, and means for shifting the gear connections.

3. A machine for treating cream comprising a vat, a hinged cover therefor, a coil arranged in the vat and having upwardly-extended end portions, standards on the ends of the vat, pulleys on said standards, a driving-shaft, ropes extended from said upwardly-extended end portions of the coil, and connecting with said driving-shaft, a gear-wheel on the driving-shaft, a pinion on the counter-shaft for engaging with said gear-wheel, and idlers with which the ropes or cables engage.

4. A machine for treating cream, comprising a vat, a pipe therein, a counter-shaft, cable connections between said pipe and the counter-shaft, a driving-shaft, and change-gear connections between the two shafts, whereby the location of the counter-shaft may be reversed while the driving-shaft rotates at all times in one direction.

In testimony whereof we have signed our names to this specification in the presence of two subscribing witnesses.

OSCAR H. NEBEL.
JOHN H. PETERSON.

Witnesses:
J. E. BORG,
J. J. KEIS.